(12) United States Patent
Münstermann et al.

(10) Patent No.: US 12,276,629 B2
(45) Date of Patent: Apr. 15, 2025

(54) METHOD, DATA SET AND SENSORED MIXER TO SENSE A PROPERTY OF A LIQUID

(71) Applicant: 3M INNOVATIVE PROPERTIES COMPANY, St. Paul, MN (US)

(72) Inventors: Benjamin Münstermann, Duisburg (DE); Knut Schumacher, Neuss (DE); Günter Zilligen, Grevenbroich (DE); Martin Stottmeister, Neuss (DE); Robert Bialluch, Willich (DE); Michael Bahners, Neuss (DE); Thomas Keller, Neuss (DE); Peter Orda, Remscheid (DE); Jörg Hahn, Bad Neuenahr-Ahrweiler (DE); Harald Westkamp, Hattingen (DE); Andreas Backes, Kaarst-Büttgen (DE); Waleri Wischnepolski, Neuss (DE); David Rudek, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 128 days.

(21) Appl. No.: 18/015,784

(22) PCT Filed: Jul. 14, 2021

(86) PCT No.: PCT/IB2021/056362
§ 371 (c)(1),
(2) Date: Jan. 12, 2023

(87) PCT Pub. No.: WO2022/013786
PCT Pub. Date: Jan. 20, 2022

(65) Prior Publication Data
US 2023/0258590 A1     Aug. 17, 2023

(30) Foreign Application Priority Data
Jul. 16, 2020  (EP) .................................. 20186305

(51) Int. Cl.
| | | |
|---|---|---|
| *G01N 27/10* | (2006.01) | |
| *G01N 27/07* | (2006.01) | |
| *G01N 27/22* | (2006.01) | |

(52) U.S. Cl.
CPC ............. *G01N 27/10* (2013.01); *G01N 27/07* (2013.01); *G01N 27/226* (2013.01)

(58) Field of Classification Search
CPC ...... G01N 27/10; G01N 27/07; G01N 27/228; G01N 27/226; G01N 27/22; G01N 27/043
See application file for complete search history.

(56) References Cited

U.S. PATENT DOCUMENTS

| | | |
|---|---|---|
| 6,168,052 B1 | 1/2001 | Keller |
| 6,682,601 B1 | 1/2004 | Beebe |
| (Continued) | | |

FOREIGN PATENT DOCUMENTS

| | | |
|---|---|---|
| CN | 107116874 B | 4/2019 |
| DE | 202004003925 U1 | 5/2004 |
| (Continued) | | |

OTHER PUBLICATIONS

International Search Report for PCT International Application No. PCT/IB2021/056362, mailed on Oct. 5, 2021, 4 pages.

(Continued)

*Primary Examiner* — Jermele M Hollington
*Assistant Examiner* — Taqi R Nasir
(74) *Attorney, Agent, or Firm* — Sriram Srinivasan (57) ABSTRACT

Sensored mixer, comprising a mixing device for mixing two or more components to produce a mixed liquid at a mixer output, and a property sensor for determining a property of a liquid, the property sensor comprising a) a channel comprising a sensing zone through which the liquid flows; b) two electrodes for generating an electric field of one or more (Continued)

sensing frequencies in the sensing zone; c) a data storage device comprising a pre-stored set of calibration data representing calibration impedance responses measured previously at the one or more sensing frequencies and at different property values of the property of an identical liquid; and d) a device to repeatedly i) generate between the electrodes an electric field of in the sensing zone; ii) sense between the electrodes, a response impedance; iii) derive from the response impedance a property value of the property of the liquid, using the pre-stored set of calibration data representing calibration impedance responses, wherein the property sensor is in fluid communication with the mixer output such that the mixed liquid can flow from the mixer output through the sensing zone. A method for sensing a property of the liquid and a data set of calibration data representing calibration impedance responses usable with the sensor and the method are also disclosed.

14 Claims, 2 Drawing Sheets

(56) References Cited

U.S. PATENT DOCUMENTS

| | | |
|---|---|---|
| 6,889,872 B2 | 5/2005 | Herman et al. |
| 6,932,237 B2 | 8/2005 | Heymann et al. |
| 7,160,609 B2 | 1/2007 | Wakizaka et al. |
| 7,246,631 B2 | 7/2007 | Georgeson et al. |
| 7,507,221 B2 | 3/2009 | Neer |
| 8,292,879 B2 | 10/2012 | Manwaring et al. |
| 8,387,825 B2 | 3/2013 | Herman et al. |
| 8,519,726 B2 | 8/2013 | Sun |
| 8,892,198 B2 | 11/2014 | Bohorquez et al. |
| 9,212,779 B2 | 12/2015 | Conley |
| 9,359,122 B2 | 6/2016 | Schmid et al. |
| 9,695,951 B2 | 7/2017 | Rodegheri et al. |
| 2002/0118025 A1* | 8/2002 | Yamagishi ........... G01N 27/226 324/672 |
| 2003/0184316 A1* | 10/2003 | Yamagishi ........... G01N 27/228 324/663 |
| 2003/0184317 A1* | 10/2003 | Yamagishi ............. C12M 41/48 324/663 |
| 2005/0104607 A1 | 5/2005 | Byington et al. |
| 2005/0194562 A1 | 9/2005 | Lavoie, Jr. et al. |
| 2006/0130897 A1 | 6/2006 | Georgeson et al. |
| 2009/0007642 A1 | 1/2009 | Busby et al. |
| 2009/0309615 A1* | 12/2009 | Reindl ................... G01N 27/22 324/684 |
| 2010/0188110 A1 | 7/2010 | Sun |
| 2012/0114089 A1 | 5/2012 | Potyrailo et al. |
| 2012/0142032 A1 | 6/2012 | Morgan et al. |
| 2016/0377567 A1 | 12/2016 | Lu et al. |
| 2017/0241929 A1 | 8/2017 | Qui et al. |
| 2019/0029555 A1 | 1/2019 | Suster et al. |

FOREIGN PATENT DOCUMENTS

| | | | |
|---|---|---|---|
| DE | 102015207021 B3 | 6/2016 | |
| GB | 2354329 A * | 3/2001 | ............... G01F 1/28 |
| GB | 2386691 B | 12/2003 | |
| JP | 09133641 A | 5/1997 | |
| JP | 2008134105 A | 6/2008 | |
| KR | 20090110785 A | 10/2009 | |
| WO | 94/03802 A1 | 2/1994 | |
| WO | 2004077629 A1 | 9/2004 | |
| WO | 2006/086041 A2 | 8/2006 | |
| WO | 2009027386 A1 | 3/2009 | |
| WO | 2012067801 A1 | 5/2012 | |
| WO | 2016165910 A1 | 10/2016 | |
| WO | 2017092472 A1 | 6/2017 | |

OTHER PUBLICATIONS

Starzyk, "Parametrization of interdigit comb capacitor for dielectric impedance spectroscopy," Archives of Materials Science and Engineering, Nov. 2008, vol. 34, No. 1, pp. 31-34.

* cited by examiner

METHOD, DATA SET AND SENSORED MIXER TO SENSE A PROPERTY OF A LIQUID

CROSS-REFERENCE TO RELATED APPLICATIONS

This application is a national stage filing under 35 U.S.C. § 371 of International Application No. PCT/IB2021/056362, filed 14 Jul. 2021, which claims the benefit of EP Application Serial No. 20186305.7, filed 16 Jul. 2020, the entire disclosure of each of which is incorporated herein by reference.

The present disclosure relates to sensors that can determine properties of liquids and to methods for determining properties of liquids. The disclosure also relates to data sets useable in such sensors and methods.

Many industrial processes use liquid materials such as liquid adhesives, liquid food ingredients, liquid coolants, or liquid reaction products, to name a few examples. Certain properties of such liquids vary over time: adhesives may cure, an oil may become less viscous as temperature rises, a coolant may age and have a lower heat capacity than initially.

Many industrial processes, however, rely on certain properties of a liquid being within a specified range or being unchanged compared to the property in an initial state.

Electrical sensors have been used for many years to determine properties of liquids or identify any deviations from desired values of those properties. The U.S. patent application US 2010/0188110 A1, for example, describes a sensor having integrated electrodes in a single sensor configuration, which is operated by alternating current including periodic electrical excitation signals of the respective multiple frequencies with the same amplitude for detecting analytes in fluids.

A further U.S. patent application, US 2009/0309615 A1, explains a method for measurement of mixing ratio of a substance mixture of at least two substances, wherein the substance mixture is brought into the measurement range of a capacitive sensor, especially moved past or through it, and wherein the mixing ratio is determined from the change in capacitance of the sensor caused by the substance mixture.

There remains a need, however, for sensors that can sense values of more properties of a liquid than mixing ratio.

The present disclosure provides, in a first aspect, a sensored mixer, comprising a mixing device for mixing two or more components to produce a mixed liquid at a mixer output, and a property sensor for determining a property value of a property of the liquid, the property sensor comprising a) a channel comprising a sensing zone through which—in use—the liquid flows; b) two electrodes for generating an electric field of one or more sensing frequencies in the sensing zone;

c) a data storage device comprising a pre-stored set of calibration data representing calibration impedance responses measured previously at the one or more sensing frequencies and at different property values of the property of an identical liquid; and d) a property value deriver, electrically connected to the electrodes, and operable to repeatedly i) generate, while the liquid flows through the sensing zone, between the electrodes an electric field of the one or more sensing frequencies in the sensing zone;

ii) sense between the electrodes, at the one or more sensing frequencies, while the liquid flows through the sensing zone and while the electric field is present, a response impedance;

iii) derive from the response impedance a property value of the property of the liquid, using the pre-stored set of calibration data representing calibration impedance responses.

Property sensors, comprised in a sensored mixer as described herein may be used to sense properties of a liquid resulting from a mixing process. They may also be used to sense properties of input liquids for a mixing process or for an industrial manufacturing process. Advantageously, separate property sensors for respective input liquids are placed just in front of the mixer. Data from these property sensors measuring the input liquids can be processed along with data from a property sensor measuring the mixed liquid, e.g. in an integrated materials property monitoring system. Where, for example, a liquid composition is mixed from three input liquids, a property of each of the three liquids before mixing can be determined using three property sensors at the respective outlets of the three containers containing the three input liquids. This may help in quality control and reduce waste that might otherwise occur due to one of the input liquids being outside a specification for the property.

The sensor in a sensored mixer according to the present disclosure can determine various properties of a liquid, like, for example, mixing ratio of a two-component adhesive or curing status of a curable composition or ageing status. The number of properties which were varied previously to establish the set of calibration data representing calibration impedance responses measured previously at the different property values determines the number of properties that can later be determined by the property sensor. The pre-stored set of calibration data representing calibration impedance responses measured previously at the one or more sensing frequencies and at different property values of a property of the liquid forms, or represents, a multi-dimensional data field which is specific for the liquid. This data field allows the property value deriver to determine, from a response impedance actually measured, a value of the property of the liquid.

A liquid has many properties: for example, viscosity, density, colour, content of volatile components, water content, chemical composition, boiling point, but also ageing status, curing status in case of liquid curable compositions, or mixing ratio in case of the liquid being a mixture, to name only some.

Not all properties of a liquid can be determined using the sensors or methods according to the present disclosure. Certain properties of certain liquids, however, vary with time and/or with other parameters such that the response impedance in a property sensor described herein varies with time and/or with the other parameters, too. Values of these properties can be derived via the present property sensor.

Variation with time includes variation of the property between different production lots of the liquid. The property sensor described herein can thus be used to detect differences in a certain property (e.g. chemical composition) of a suitable liquid between a later production lot and an earlier production lot of the liquid.

The term "property" of the liquid, according to the present disclosure, is not particularly limited. In certain embodiments, a property is a mixing ratio of two or more components of the liquid. In certain of these embodiments, the liquid is a two-component adhesive, and a property of the liquid is a mixing ratio of the components. In other embodiments, a property is a curing degree or a curing status. In certain of these embodiments the liquid is a curable composition, and a property of the liquid is the degree of curing of the composition.

In other embodiments, a property is an ageing degree or an ageing status. In certain of these embodiments the liquid is an ageing liquid, i.e. a liquid in which certain characteristics change over time once the ageing liquid has been created. The property sensor may determine a change in the response impedance of the ageing liquid after some ageing, compared to response impedances of an identical liquid recorded before ageing and at certain times after ageing. The property sensor may thereby determine an ageing degree or an ageing status of the liquid.

A property of the liquid may take different values, such as, for example, a property "dynamic viscosity" of the liquid "water" can take values like 1.30 mPa·s or 0.31 mPa·s. Such values are referred to herein as property values.

Certain properties may not be related to only numerical property values. A property "curing degree", for example, may have property values like, for example, "uncured", "partially cured" or "fully cured". A property "curing status", for example, may have property values like, for example, "uncured" or "fully cured".

A liquid according to the present disclosure may be a viscous liquid.

Independent of its viscosity, the liquid may be a flowing liquid. The liquid may be a continuously flowing liquid.

In certain embodiments, a liquid is a liquid adhesive. In certain of these embodiments, a liquid is a curable liquid adhesive. In certain of these embodiments, a liquid is a curable two-part liquid adhesive. "Two-part" refers to the adhesive being composed of a first component and a second component which are mixed, e.g. in a static or dynamic mixer, to form the adhesive.

In other embodiments, the liquid is, or comprises, a void filler, a sealant, a dielectric fluid such as a 3M™ Novec™ engineered fluid, a thermally conductive interface material such as a thermally conductive gap filler, or a liquid chemical composition to produce any of the aforementioned liquids.

The channel of the property sensor facilitates flowing of the liquid through the sensing zone. The liquid may flow through the channel and through the sensing zone.

The channel may define a flow direction of the liquid. The channel may have, at any point along the flow direction, a cross section, e.g. a cross section determined orthogonally to the flow direction. The channel may have a length, measured along the flow direction. The cross section may be constant over the length of the channel. The channel may have, for example, a circular cross section, an elliptical cross section, a rectangular or a square cross section, over the length of the channel, wherein the cross section is constant over the length of the channel.

The channel may be, for example, a passageway in a static mixer or a passageway in an extruder, through which passageway the liquid can flow.

The channel of the property sensor of a sensored mixer according to the present disclosure comprises a sensing zone. When the property sensor is in use, the liquid flows through the sensing zone. The electric field generated by the property value deriver via the electrodes extends into the sensing zone. The liquid flowing through the sensing zone is exposed to the electric field and provides a specific impedance in the electric field between the electrodes.

The property sensor may be designed such that the sensing zone is delimited by the channel.

In certain embodiments the sensing zone is a longitudinal section of the channel.

The shape of the electrodes is not of great importance, as long as they can generate an electric field of appropriate strength and geometry in the sensing zone. The strength and geometry of the field must be chosen such that there is a field strength available in the sensing zone sufficient to determine a response impedance.

In certain embodiments the sensing zone is arranged between the electrodes. Such an arrangement may provide for a stronger electric field in the sensing zone and to a more accurate sensing of the response impedance.

In certain embodiments the electrodes are opposed parallel plates, forming a plate capacitor. The dielectric of this plate capacitor may comprise the liquid flowing through the sensing zone.

In certain other embodiments the electrodes are, or comprise, parallel plates, arranged side by side in a same geometric plane. This is a potentially space-saving arrangement of the electrodes, which furthermore allows arranging both electrodes on the same side of the sensing zone. In such arrangements a fringe field between the electrodes may extend into the sensing zone.

In certain embodiments the electrodes are arranged outside of the channel. This avoids direct contact between the liquid and the electrodes, which may help protect the electrodes from mechanical or chemical impact by the liquid.

In certain other embodiments the electrodes are arranged inside the channel. In some of these embodiments the electrodes are immersed in the liquid. Such arrangements may provide for a stronger response impedance signal.

In certain embodiments one or both of the electrodes is/are arranged such as to be in contact with the liquid when the liquid flows through the sensing zone. Again, such an arrangement may provide for a stronger response impedance signal and less noise.

In certain embodiments, an electrode comprises a flat plate, oriented parallel to the flow direction of the liquid at the location of the electrode. The parallel arrangement may result in a smoother flow of the liquid at the location of the electrode and to less mechanical force exerted on the electrode. In certain of these embodiments, each electrode comprises a flat plate, oriented parallel to the flow direction of the liquid at the location of the respective electrode.

In certain embodiments an electrode is a conductive path or a conductive patch on a front surface of a printed circuit board (PCB). Areas on the front surface of the PCB adjacent to the conductive path or patch forming the electrode may be covered with a further, separate conductive layer to act as a shielding which limits the effective capacitor plate electrode area to the area of the conductive path or patch. A similar conductive layer can be applied on the rear surface of the PCB, forming a shielding to reduce impact of external electrical fields on the electrode and thereby to help improve the overall accuracy of the property sensor.

A property sensor in a sensored mixer according to the present disclosure may have further electrodes for generating the electric field of one or more sensing frequencies in the sensing zone. A property sensor in a sensored mixer according to the present disclosure may have a third electrode for generating the electric field of one or more sensing frequencies in the sensing zone. A property sensor in a sensored mixer according to the present disclosure may have a third and a fourth electrode for generating the electric field of one or more sensing frequencies in the sensing zone. Further electrodes may help in strengthening or shaping the electric field in the sensing zone. This may result in stronger response impedance signals and enhanced accuracy in sensing the property of the liquid. A further electrode may also allow to increase the maximum allowable flow rate of the liquid through the sensor.

Hence in certain embodiments, the property sensor comprises a third electrode for generating the electric field of one or more sensing frequencies in the sensing zone. The third electrode may be on a voltage different from the voltage of the two electrodes. In certain embodiments, the property sensor comprises a third electrode and a fourth electrode for generating the electric field of one or more sensing frequencies in the sensing zone. The third electrode and/or the fourth electrode may be on a voltage different from the voltage of the two electrodes.

The electric field between the electrodes is an alternating (AC) electric field. It causes displacement currents in the liquid in the sensing zone. By precisely measuring the voltage applied between the electrodes and the resulting current in the time domain, response impedances can be sensed. For sensing response impedances at different sensing frequencies, the electric field generated between the electrodes in the sensing zone can be generated, for example, such that it oscillates with a first constant amplitude at a first sensing frequency for a certain time during which the response impedance at that first sensing frequency is sensed, then oscillates with a second constant amplitude at a second sensing frequency for a certain time during which the response impedance at that second sensing frequency is sensed. If a third sensing frequency is used, the electric field is then made to oscillate with a third constant amplitude at a third sensing frequency for a certain time during which the response impedance at that third sensing frequency is sensed, and so on.

Instead of generating the sensing frequencies sequentially and sequentially measuring a response impedance at each sensing frequency separately, all amplitudes and all desired sensing frequencies can be generated at the same time, overlaid with each other via, e.g., Fourier synthesis, to form a single pulse or "burst" of a specific shape in a time-amplitude diagram. The resulting of an overlay of many frequencies can be a kind of electromagnetic noise. Where a plurality of sensing frequencies are overlaid with each other for an extended time, they may form a repetitive shape in a time-amplitude diagram.

Where a plurality of sensing frequencies are overlaid with each other, the resulting response impedance signal can be separated, i.e. filtered, into frequencies, e.g. via Fourier analysis, to obtain a response impedance for each individual sensing frequency.

Depending on the type of liquid, a useful sensing frequency may be, for example, a frequency of 32 Hertz (Hz), of 100 Hz, 1000 Hz, 5000 Hz or of 8000 Hz. Generally, a sensing frequency may be a frequency between 1 Hertz and 10000 Hertz (10 kHz), or even up to 100000 Hz (100 kHz). In certain preferred embodiments, the sensing frequency is a frequency between 200 Hz and 2000 Hz, because small differences in values of important properties of certain industrial liquids result in particularly strong differences in response impedance in this frequency range.

The voltage between the electrodes may be a voltage between 0.1 Volt and 100 Volt. It is typically between 1 Volt and 20 Volt, preferably between 1 Volt and 10 Volt. Voltages above 1 Volt were found to provide for an acceptable signal-to-noise ratio with certain liquids. Voltages below 100 Volt are well below the dielectric strength of many typical liquids that may be used in the property sensor described herein, assuming a typical distance between the electrodes of a few millimeters.

In certain embodiments the amplitude of the electric field is between 100 Volt per meter and 20000 Volt per meter. Such field strengths, at sensing frequencies in the range explained above, have shown to facilitate reliable sensing of response impedances at adequate accuracy. These amplitudes are low enough to avoid electrolysis in the liquid and the associated change its chemical composition, but were found high enough for obtaining sufficiently strong response impedance signals for many liquids.

Values for a property of the liquid are obtained using the set of calibration data representing calibration impedance responses, stored previously. Calibration data representing a set of calibration impedance responses for a specific property of a specific liquid can be obtained, for example, by recording, for each of several values of the property, impedance responses at different sensing frequencies measured on an identical liquid in the same, or an identical, property sensor. The impedance responses thus measured are the calibration impedance responses which are later, at the time of a "real" measurement, used to relate response impedances of the "real" measurement to the calibration impedance responses and derive a property value from this relation. Alternatively, the impedance responses thus measured can, for example, be used to compute a set of parameters that mathematically describe a multi-dimensional data field, e.g. a set of polynomials or a parameterized multi-dimensional surface, which can be used to derive from a measured response impedance a property value of the liquid. The parameters may be derived in a calibration procedure using an identical liquid in the property sensor, they may be stored on the data storage device and can during the measurement be used to compute the polynomials or the multi-dimensional surface at specific response impedance values.

Generally, calibration impedance responses may vary with variables like, for example, the value of the property of the liquid, the sensing frequency, the temperature of the liquid in the sensing zone, and potentially other parameters such the degree of curing, where the liquid is a curable composition. The calibration impedance response (CIR) is thus a function of a number of variables:

CIR=$f$ (value of property, sensing frequency, temperature, . . . )

and correspondingly the value of the property of the liquid is the inverse function value of property=$f^{-1}$ (CIR, sensing frequency, temperature, . . . )

To obtain a set of calibration data representing calibration impedance responses, all variables are varied in a controlled way, simultaneously or sequentially, within respective intervals that reflect potential values of these variables in a measurement. For each combination of variables, the calibration impedance response is recorded, yielding eventually a multi-dimensional data field. This data field either is the set of calibration impedance responses which is later used to derive from response impedances taken in a measurement a value of the property of the liquid, or this data field is used to compute a set of calibration data representing these calibration impedance responses, such as a set of parameters for a set of polynomials fitting the calibration impedance responses. For this step, some of the variables are determined and fixed during the measurement, such that eventually the only unknown variable is the value of the property.

This unknown variable can then be derived from the set of calibration impedance responses, or from the set of calibration data representing the calibration impedance responses, by taking into account the fixed or determined values of the other variables and the impedance response recorded in the measurement.

During the calibration process, a calibration impedance response that corresponds to a specific response impedance may not have been recorded. In such a case an interpolation may be performed on the set of calibration impedance responses to compute a property value for the specific response impedance, or the set of calibration data representing calibration impedance responses may be used to compute a property value for a specific response impedance.

The term "interpolation process" as used herein refers to any kind of mathematical process that provides a property value for a response impedance that is between two or more calibration impedance responses in the set of calibration impedance responses represented by the set of calibration data.

Calibration impedance responses may, for example, be represented by a set of calibration data in a similar manner as a set of z-values over an x-y-plane can be represented by a set of parameters a, b, c of a two-dimensional polynomial $p_{a,b,c}(x, y)$ which fits or approximates these z-values. Calibration data may thus be parameters of a function or set of functions which contain, approximate, or best-fit the calibration impedance responses measured previously in a calibration procedure.

Alternatively, calibration impedance responses may, for example, be represented by themselves. In such cases it may have been found beneficial to not fit or approximate the measured calibration impedance responses by a function, but use the calibration impedance responses as such.

In order to speed up an interpolation process, the set of calibration impedance responses may have the form of a multi-dimensional data field. which is represented by the set of calibration data. The calibration impedance responses may have the form of a parametrized multi-dimensional data field, which is represented by the set of calibration data. A parameter in the parametrized multi-dimensional data field may be response impedance. Alternatively, or in addition, a parameter in the parametrized multi-dimensional data field may be the temperature of the liquid in the sensing zone.

Generally, different liquids will have different values of a certain property, under otherwise identical conditions. To optimize sensing accuracy, the calibration impedance responses should be generated using a liquid that is identical, i.e. sufficiently similar, to the liquid of which a property is to be sensed later. In certain embodiments, however, the calibration impedance responses may be generated using a different liquid and adjusting mathematically the impedance values thus obtained for differences between the liquids to obtain a set of calibration impedance responses.

Generally, different property sensors will output slightly different values of a certain property, even for identical liquids and under otherwise identical conditions. This is due to uncontrollable tolerances, e.g. in geometries of the channel and of the electrodes. To improve sensing accuracy, the set of calibration impedance responses should be generated using the property sensor that is later used to sense response impedances, or an identical property sensor. In certain embodiments, however, the calibration impedance responses may be generated using a different property sensor and adjusting mathematically the impedance values thus obtained for differences between the property sensors to obtain calibration impedance responses.

The set of calibration data representing calibration impedance responses is stored in the data storage device before the property value deriver uses the calibration data representing calibration impedance responses and the response impedance of the current measurement to derive a value of a property of the liquid.

The set of calibration data representing calibration impedance responses may have been stored in the data storage device in a separate calibration process some time before the industrial manufacturing process is performed.

The pre-stored set of calibration data representing calibration impedance responses is stored on the data storage device, e.g. in a digital format. The data storage device comprising the pre-stored set of calibration data representing calibration impedance responses may be, for example, a random-access memory (RAM), a hard-disk, a USB removable media, an optical disc such as a CD-ROM or a DVD, a cloud server, a network server, a computer in a network, or any other suitable storage device.

The property value deriver accesses the data storage device to obtain the set of calibration data representing calibration impedance responses stored thereon. The data storage device is therefore operationally connected to the property value deriver. It may be operationally connected to the property value deriver at least before the property value deriver derives from the response impedance a property value of the property of the liquid. It may be operationally connected to the property value deriver at least while the property value deriver derives from the response impedance a property value of the property of the liquid.

The data storage device may be comprised the property value deriver. The data storage device may be arranged inside the property value deriver. Alternatively, the data storage device may be arranged outside the property value deriver, e.g. remote from the property value deriver.

In certain embodiments the property value deriver is a computerized property value deriver. A computerized property value deriver has a digital processor and memory. In such embodiments, the data storage device may be a mass storage device or a removable media connected to the computerized property value deriver. A computerized property value deriver may be operationally connected to a mixer or an extruder through which the liquid flows into the channel The property value deriver performs at least the functions of i) generating an electric field between the electrodes, ii) sense a response impedance, and iii) derive from the response impedance a value of a property of the liquid using the set of calibration data representing calibration impedance responses. The property value deriver therefore may comprise a first functional unit for generating a voltage of one or more frequencies between the electrodes.

The property value deriver may comprise a second functional unit for sensing an impedance. The second functional unit may comprise a current sensor.

The property value deriver may comprise a third functional unit for deriving a value of a property from the response impedance and the set of calibration data representing calibration impedance responses. This third functional unit may be a computerized functional unit, i.e. it has a digital processor and memory. In such embodiments, the data storage device may be a mass storage device or a removable media connected to the computerized third functional unit. A computerized third functional unit may be operationally connected to a mixer or an extruder through which the liquid flows into the channel The electrical field is generated between the two electrodes and extends into the sensing zone. Depending on the geometry of the electrodes and their arrangement relative to each other, the electric field extends into areas which are not necessarily located geometrically between the electrodes.

The electric field may be homogenous or comprise a homogenous portion, for example where the electrodes are flat, of equal size, parallel and opposed to each other, forming a classic plate capacitor. Generally, it is not required that the field be homogenous in the sensing zone, so the electric field can be homogenous or inhomogenous in the sensing zone.

Generally, an electrical impedance is a frequency-dependent resistance, i.e. a ratio of voltage to current, and a measure of the opposition to time-varying electric current in an electric circuit. The property value deriver in a property sensor in a sensored mixer according to the present disclosure generates an alternating electric field and thereby an AC voltage between the electrodes and senses a response impedance by sensing the electric current caused by the applied AC voltage. Dividing the voltage at a sensing frequency by the current at the sensing frequency yields the impedance at the sensing frequency.

The property deriver can derive from a response impedance a property value of the property of the liquid, using the pre-stored set of calibration data representing calibration impedance responses. In one aspect, the property value deriver operates such as to use the dependency of the calibration impedance response on the value of a property. This dependency is mirrored in the calibration impedance responses and in the set of calibration data representing the calibration impedance responses.

Each set of CIR, sensing frequency, temperature and other parameters defines a point in a multi-dimensional parameter space, at which point the associated value of the property was present in the calibration process. After calibration the actual measurement may be performed at different parameters, e.g. a different sensing frequency, a different temperature, etc., yielding a different response impedance MRI. To identify the property value using the measured response impedance (MRI)

value of property=$f^1$ (MRI,sensing frequency,temperature, . . . )

the parameters of the calibration process may have to be interpolated in order to match with the parameters of the measurement, and to be able to derive a value of the property at the exact point in the parameter space at which the measurement was performed.

The calibration data, in turn, represent the calibration impedance responses, i.e. the CIR values as dependent on the parameters:

CIR=$f$ (value of property,sensing frequency,temperature, . . . )

The calibration data may thereby help to find the inverse function $f^1$ or help to find CIR values that are closest to measured response impedance values MRI and their associated value of the property of the liquid. Indicating interpolated values for the parameters with an asterisk, a value of the property may be identified by using the inverse function with the interpolated values:

Value of property=$f^1$ (CIR*,sensing frequency*,temperature*, . . . )

CIR values taken during calibration would be interpolated to yield the MRI sensed during measurement, a sensing frequency used during the calibration process would be interpolated to yield the sensing frequency used during the measurement, and temperatures used in the calibration process would be interpolated to yield the temperature in the actual measurement. A value of the property of the liquid can thus be derived from the response impedances using the pre-stored set of calibration data representing calibration impedance responses.

Sometimes, neither f nor its inverse $f^1$ are explicitly known. Instead, a multi-dimensional data field representing f (CIR, . . . ) may then be numerically examined to find the best matching value for $f^1$ (MRI, . . . ). The multi-dimensional data field may be the result of a mathematical operation, such as, for example, a regression operation, a minimization operation, or an interpolation. This mathematical operation may use calibration impedance response data measured in a previous calibration run as an input.

In certain embodiments the property value deriver comprises a machine learning device, operable to derive from the response impedance a property value of the property of the liquid, using the pre-stored set of calibration impedance responses. In certain of these embodiments the pre-stored set of calibration impedance responses may be, or may be comprised in, a set of training data for training the machine learning device.

Finding a best matching value may involve interpolation between several data points in the set of calibration impedance responses or interpolation between data points in the set of calibration data. For example, in calibration, a mixing ratio might have been determined at two calibration impedance responses. In measurement, the response impedance might fall between these two calibration impedance responses. In order to identify a mixing ratio in measurement, the resulting mixing ratio is obtained from interpolating between the mixing ratios of the respective calibration impedance responses.

In certain embodiments, using the pre-stored set of calibration data representing calibration impedance responses comprises comparing a measured response impedance to calibration impedance responses. In certain embodiments, using the pre-stored set of calibration impedance responses comprises determining calibration impedance responses closest to the response impedance. In certain embodiments, using the pre-stored set of calibration data representing calibration impedance responses comprises determining a property value of the property of the liquid by interpolating between two property values of the property comprised in the calibration impedance responses represented by the set of calibration data.

In certain embodiments, using the pre-stored set of calibration data representing calibration impedance responses comprises identifying a calibration impedance response data point at which at least the response impedance is closest to a calibration impedance response and at which the sensing frequency at which the calibration impedance response was recorded is closest to the sensing frequency generated.

Calibration impedance responses may include calibration impedance responses taken at different values of a property of the liquid and taken at one sensing frequency. However, it may not be sufficient for the set of calibration impedance responses to include calibration impedance responses of a variable property at one single sensing frequency. For example when sensing response impedances of a curable two-component adhesive at one given sensing frequency and at a given temperature of the adhesive in the sensing zone, a combination of a first mixing ratio of the components and a first curing degree may yield the same response impedance as a combination of a second mixing ratio and a second curing degree. When attempting to derive values of the property "mixing ratio", this potential ambiguity can often be resolved by performing calibration measurements at various different sensing frequencies, because mixing ratio and curing degree often vary differently with sensing frequency. Hence it may be advantageous to include in the set of calibration impedance responses data points of impedance responses at different mixing ratios at different curing degrees at different sensing frequencies. Therefore generally, calibration impedance responses may include calibration impedance responses taken at different values of a property of the liquid and taken at two or more sensing frequencies.

The property sensor of the sensored mixer described herein may be used to determine a mixing ratio of the components of a two-component liquid, e.g. a two-component adhesive. The channel of the property sensor is connected to an output of a mixer, so that the mixed liquid flows through the channel. To dispense the two components into the mixer, a dual-cartridge dispenser may be used that can provide arbitrary mixing ratios of the components. In such a dispenser two motors with microprocessor-controlled rotation speed move two pistons into the cartridge (e. g. a standard two-component 4:1 cartridge like Sulzer MIX-PAC™ F-System). The motor speed may be controlled by pulse-width modulation. To extend the motor speed range, the voltage supply for each motor is adjustable. For various mixing ratios the first motor rotates with a given speed and the speed of the second motor follows with a factor based on the desired mixing ratio. The rotation speed and the absolute linear position of the pistons define the dispensed volume of the respective component. The property sensor may be arranged at the output end of the mixer to sense the mixing ratio there. The sensed value of the property "mixing ratio" can be used to control the motors to keep or achieve a desired mixing ratio in the two-component liquid.

The motors driving the respective pistons can be monitored by using the feedback from the actuator of the motor to monitor motor rotation speeds. The feedback loop uses information from the motor control system and does not need additional sensors. The motors can be monitored through a rolling average as they are running. When the speed of a motor falls below a set threshold, the system can determine that there is likely to be a blockage. This blockage can be caused by plungers inside the cartridge at setting up the dispenser or during dispensing by something preventing the free flow of liquid through the system.

The dispenser can be enhanced by using a third motor to drive a conveyor pump between the cartridges and the mixer. To relieve the cartridge pressure such a conveyor pump can pump the components from a common output nozzle of the two cartridges through the mixer. This will enable a much better and precise conveying especially for high viscosity liquids with different mixing ratios.

In certain embodiments the electrodes form a capacitor. The electrodes may be, for example, opposed parallel plates, such as opposed parallel square plates of 13 mm side length, spaced by about 1 millimeter. Generally, the distance between the electrodes may be at least 0.2 millimeter (mm). More viscous liquids generally require a larger distance between the electrodes to not impede the flow. Preferably, the distance between the electrodes is between 1.0 mm and 10.0 mm. Depending on the required throughput and the type of liquid, the distance between the electrodes may be, for example, 0.5 mm or more, 2.0 mm or more, 5.0 mm or more, 8.0 mm or more, 15.0 mm or more, or even a few centimeters.

In use, the dielectric of the capacitor comprises the liquid flowing through the sensing zone. The capacitor may have a capacitance of between 1 picofarad and 10 picofarad when the sensing zone is filled with air and does not contain liquid. Capacitors of such a capacitance achieve good signal-to-noise ratios in property sensors as described herein.

Ageing is known to change electric properties of certain liquids. Ageing may cause loss of water from a liquid, resulting in a lower number of polar molecules. Ageing may also cause chemically instable liquids to form new molecules. These changes over time may be detectable using a property sensor as described herein. Similarly, open time of an adhesive, which can be considered a form of short-term ageing, can be determined with a property sensor in a sensored mixer according to the present disclosure.

In certain embodiments the property of a liquid is an age of the liquid. The property sensor can derive a value for the age of the liquid. As is known in chemistry and process engineering, ageing of a liquid refers to a change in properties of the liquid occurring over time under normal storage conditions. "Age" of the liquid hence refers to a state of the liquid which it acquires, under its normal storage conditions, in the time span since it contained all its components for the first time.

It may occur that the pre-stored set of calibration data representing calibration impedance responses was recorded for a liquid that is not identical to the liquid used in the actual measurement, potentially resulting in a gross mismatch between calibration impedance responses and response impedances actually measured. The property sensor may thus also be used to detect that—e.g. erroneously—a considerably different type of liquid, or a liquid with considerably different properties, is run through the property sensor than the liquid that was intended.

In certain embodiments of the sensored mixer according to the present disclosure, the property sensor comprises a duct piece comprising the channel and the electrodes. The duct piece comprises an inlet for the liquid and an outlet for the liquid, facilitating flow of the liquid from the inlet to the outlet. The inlet is connectable with an output end of a tube conducting the liquid such as to let the liquid flow from the tube into the duct piece. The tube may be, for example, an output tube of a mixer or of an output hose of an extruder.

The inlet may have an inlet open cross section through which the liquid can enter the duct piece. The outlet may have an outlet open cross section through which the liquid can exit the duct piece. The size of the inlet open cross section and the size of the outlet open cross section may be equal. Alternatively, the size of the inlet open cross section may be greater than the size of the outlet open cross section. This would result in a faster flow of the liquid at the outlet of the duct piece than at the inlet, which may be desirable in certain cases. Yet alternatively, the size of the inlet open cross section may be smaller than the size of the outlet open cross section. This would result in a slower flow of the liquid at the outlet of the duct piece than at the inlet, which may be desirable in certain other cases.

The channel, e.g. in a duct piece, may comprise a widened portion through which the liquid can flow. The widened portion has an enlarged open cross section, the size of the enlarged open cross section being larger than the size of an open cross section of a portion of the channel located upstream of the widened portion. The larger cross section may help reduce the liquid pressure in the widened portion of the channel and may thereby reduce the risk of mechanical deformation of the channel. Also, the wider open cross section may help reduce the flow speed of the liquid in the widened portion of the channel.

The channel may comprise a single available flow path or a plurality of parallel available flow paths. Parallel flow paths allow the liquid to flow through different sub-channels. An open cross section of the channel, e.g. in the widened portion, may then be the sum of all open cross sections of all available flow paths of the channel at a given position of the channel along the flow direction.

The sensing zone may be comprised in the widened portion, or the widened portion may form the sensing zone. The reduced pressure and the reduced flow speed in the sensing zone may improve the accuracy of the property sensor and may help reduce the risk of mechanical deformation of the electrodes.

Hence, generally, in certain embodiments the channel comprises a first longitudinal section having a first open cross section available for the flow of the liquid, and a second longitudinal section, downstream from the first longitudinal section, having a second open cross section available for the flow of the liquid, wherein the second open cross section is larger than the first open cross section, and wherein the sensing zone is comprised in the second longitudinal section.

Generally, the duct piece may define a plurality of different parallel flow paths for flow of the liquid from inlet to outlet. One flow path of this plurality of flow paths is the flow path through the sensing zone. The other flow paths may be referred to as bypasses, as the liquid flowing through them bypasses the sensing zone.

In certain embodiments, the channel is shaped such that all of the liquid entering the duct piece through the inlet flows through the sensing zone. This arrangement may be beneficial because it allows sensing, in the sensing zone of the channel, of the property on the full volume of the liquid, which may result in a stronger response impedance signal.

In other embodiments, however, the duct piece is shaped such that a first portion of the liquid entering the duct piece through the inlet flows through the sensing zone to the outlet, and a second portion of the liquid entering the duct piece through the inlet flows to the outlet through a bypass or through a plurality of bypasses.

Hence in certain embodiments the channel comprises a bypass, arranged such that a first portion of the liquid flows through the sensing zone, and a second portion of the liquid flows through the bypass bypassing the sensing zone.

In certain embodiments one of the electrodes is arranged between the sensing zone and the bypass. In certain embodiments in which the channel comprises two or more bypasses, one of the electrodes is arranged between the sensing zone and a bypass. In other words, a/the bypass and the sensing zone may be arranged on opposite sides of one of the electrodes. Such arrangements may help improve the mechanical stability of the property sensor, as the same pressure in the liquid is exerted onto opposite sides of the electrode, which can help avoid deformation of the electrode. Deformation would otherwise result in variations in the capacitance of the capacitor formed by the electrodes and correspondingly in uncontrolled variations in the response impedances measured. These variations may even depend on the flow speed of the liquid.

Generally, both electrodes may benefit from pressure on both sides, in particular where the electrodes are flat conductive areas on surfaces of respective printed circuit boards. Hence in some embodiments, the duct piece is shaped such that a first portion of the liquid entering the duct piece through the inlet flows through the sensing zone to the outlet, a second portion of the liquid entering the duct piece through the inlet flows through a first bypass to the outlet, and a third portion of the liquid entering the duct piece through the inlet flows through a second bypass to the outlet. The sensing zone may be arranged between the electrodes. The first bypass and the sensing zone may be arranged on opposite sides of a first electrode of the two electrodes, and the second bypass and the sensing zone may be arranged on opposite sides of the second electrode of the two electrodes.

A property sensor in a sensored mixer as described herein may comprise a second sensing zone, arranged in a bypass, through which in use the liquid flows, two bypass electrodes for generating an electric field of one or more sensing frequencies in the second sensing zone. The property value deriver may be electrically connected to the bypass electrodes and operable to repeatedly i) generate, while the liquid flows through the second sensing zone, between the bypass electrodes an electric field of the one or more sensing frequencies in the second sensing zone; ii) sense between the bypass electrodes, at the one or more sensing frequencies, while the liquid flows through the second sensing zone and while the electric field is present, a second response impedance; iii) derive from the response impedances sensed in the (first) sensing zone and the second response impedance sensed in the second sensing zone a property value of the property of the liquid, using the pre-stored set of calibration data representing calibration impedance responses.

A property sensor comprising a first and a second sensing zone in a bypass may allow for a greater flow rate of the liquid through the sensor and/or lower pressure in the channel and may provide a stronger response impedance signal and a higher signal-to-noise ratio.

A property sensor in a sensored mixer according to the present disclosure may further comprise a temperature sensor for sensing a temperature of the liquid in the channel or in the sensing zone. Response impedances may depend strongly on the temperature of the liquid, hence knowledge of the temperature of the liquid in the channel, and in particular of the liquid in the sensing zone, may increase the accuracy of the derivation, from the response impedance, of a value of the property of the liquid, using the pre-stored set of calibration data representing calibration impedance responses. It is desirable that the temperature of the liquid in the sensing zone be known to an accuracy of about 0.2° C.

The temperature sensor may be arranged in the duct piece. The temperature sensor may be arranged such that two opposed outer surfaces of the temperature sensor are in surface contact with the liquid. This arrangement may help improve the precision of the temperature sensing.

A property sensor in a sensored mixer according to the present disclosure may further comprise a flow speed sensor for sensing a flow speed of the liquid through the channel or through the sensing zone. A flow speed sensor may be useful in identifying partial or complete blockages in the channel or in other devices through which the liquid flows before it is dispensed. Where the liquid is a curable composition, a flow speed sensor may help determine the time elapsed since curing started and thereby help estimate a curing status or curing degree of the curable composition.

In certain embodiments, the flow sensor comprises an upstream temperature sensor and a downstream temperature sensor as well as a heating resistor, arranged close to the downstream temperature sensor. Current applied to the heating resistor heats up the surrounding liquid. The flow rate of the liquid can be derived in known ways from the temperature difference of the liquid determined between the temperature sensors. The upstream and downstream temperature sensors are in good thermal contact with the liquid. They may, for example, be arranged in the duct piece, e.g. in a housing of the duct piece. Where the property sensor comprises a duct piece, the flow sensor may be arranged in the duct piece.

For detachably connecting the duct piece to an existing mounting bayonet of a dual-cartridge dispenser mentioned above, a fastening device is slipped over the inlet of the duct piece before attaching the duct piece to the dispenser and then rotated to attach the duct piece to the dispenser.

The fastening device comprises a bayonet-nut with an integrated hexagonally-shaped hole at an opposite end of the bayonet opening in combination with a hexagonally-shaped end of the duct piece inlet.

After attaching the duct piece to the cartridge, the bayonet-nut can be rotated so the duct piece is fixed in position. During the rotation of the nut the flat areas of the hexagonal hole of the nut will be placed in front of the hexagonal edges of the duct piece. This avoids axial movement of the duct piece.

A property sensor in a sensored mixer as described herein is connected with a mixing device to form the sensored mixer. The property sensor can thereby determine a value of a property of a mixed liquid flowing out of the mixing device.

The mixing device is operable to mix two or more components to produce a mixed liquid at a mixing device output. The property sensor may determine, for example, a value of the mixing ratio of the mixed liquid flowing out of the mixing device output. Should the mixing ratio thus determined be outside a desired bandwidth of allowable mixing ratios, the property sensor generates a warning signal to prompt an operator action or generates a control signal to cause a change in the relative input volumes of the components entering the mixing device.

The present disclosure thus provides a sensored mixer, comprising a mixing device for mixing two or more components to produce a mixed liquid at a mixer output, and a property sensor as described herein, in fluid communication with the mixer output such that the mixed liquid can flow from the mixer output through the sensing zone.

In a further aspect, the present disclosure also provides a process of determining a property value of a property of a liquid, comprising the steps, in this sequence, of
i) providing a liquid and a property sensor as described herein, and having the liquid flow through the sensing zone;
ii) generating, while the liquid flows through the sensing zone, between the electrodes an electric field of the one or more sensing frequencies in the sensing zone;
iii) sensing between the electrodes, at the one or more sensing frequencies, while the liquid flows through the sensing zone and while the electric field is present, a response impedance; and
iv) deriving from the response impedance a property value of the property of the liquid, using the pre-stored set of calibration data representing calibration impedance responses.

This determination process allows to determine a property of a liquid, like, for example, a mixing ratio of a two-component adhesive or a curing status of a curable composition or an ageing status. The calibration impedance responses measured previously at the one or more sensing frequencies and at different property values of a property of the liquid forms a multi-dimensional data field which is specific for the liquid. This data field is represented by the set of calibration data. It allows a property value deriver as explained above to determine, from a response impedance actually measured, a value of the property of the liquid.

The property sensor described above is operable to perform steps ii), iii), and iv) of the determination process.

When describing the property sensor in a sensored mixer according to the present disclosure, several variations that can be implemented for generating the electric field, for sensing a response impedance and for deriving a property value, were disclosed herein. These variations can equally be implemented for the determination process described in the preceding paragraph and will generally yield the same benefits and advantages.

The first step i) of the determination process may be preceded by a calibration process, i.e. by a preceding step of measuring calibration impedance responses and pre-storing, in the data storage device, a set of calibration data representing the calibration impedance responses, measured in the same property sensor using an identical liquid. The identical liquid has properties identical to the properties of the liquid that is later to be measured in the property sensor to determine a value for one of its properties. It might also be referred to as a "calibration liquid", as it is used to generate calibration impedance responses and the calibration data representing the calibration impedance responses.

This preceding step may comprise the substeps of m) providing a property sensor comprising a channel comprising a sensing zone through which—in use—the identical liquid flows, comprising two electrodes for generating an electric field of one or more sensing frequencies in the sensing zone; n) providing an identical liquid having a property of a known property value, o) generating, while the identical liquid flows through the sensing zone, between the electrodes an electric field of the one or more sensing frequencies in the sensing zone; and p) sensing between electrodes, at the one or more sensing frequencies, while the identical liquid flows through the sensing zone and while the electric field is present, a calibration impedance response.

This preceding step can be repeated several times to generate, for a plurality of property values of the property of the calibration liquid, a set of calibration data representing the calibration impedance responses, useable in the determination process described above.

In certain embodiments of the determination process, at least one of the one or more sensing frequencies is a frequency of 32 Hertz (Hz), of 100 Hz, 1000 Hz, 5000 Hz or of 8000 Hz. Generally, at least one of the one or more sensing frequencies may be a frequency of between 1 Hertz and 10000 Hertz (10 kHz). At least one of the one or more sensing frequencies may be a frequency between 1 Hertz and 100000 Hertz (100 kHz). In certain preferred embodiments of the determination process, the sensing frequency is a frequency between 200 Hz and 2000 Hz, because small differences in values of important properties of certain industrial liquids result in particularly strong differences in response impedance in this frequency range.

The voltage between the electrodes may be a voltage between 0.1 Volt and 100 Volt. It is typically a few volts, for example a voltage of between 1 Volt and 20 Volt, preferably between 1 Volt and 10 Volt, for certain liquids and certain arrangements of the electrodes the voltage between the electrodes may be 0.1 Volt, for other liquids and other electrode arrangements the voltage between the electrodes may be 100 Volt, or any voltage between 0.1 Volt and 100 Volt.

In certain embodiments the amplitude of the electric field is between 100 Volt per meter and 20000 Volt per meter. Such amplitudes, at sensing frequencies in the range explained above, have shown to facilitate reliable sensing of response impedances at adequate accuracy, while avoiding electrolysis or electrical discharges through the liquid.

Hence in certain of these embodiments, at least one of the one or more sensing frequencies is a frequency of between 1 Hertz and 10000 Hertz, and the amplitude of the electric field is between 100 Volt per meter and 20000 Volt per meter.

The determination process and the property sensor can be used for determining a property value of a broad spectrum of liquids. Almost any liquid which yields different response impedances at different values of a property can, in principle, be used. In certain embodiments of the determination process the liquid is an adhesive or a curable adhesive or a two-component adhesive or a multi-component adhesive or a curable two-component adhesive. In certain embodiments, a liquid is a liquid adhesive. In certain of these embodiments, a liquid is a curable liquid adhesive. In certain of these embodiments, a liquid is a curable two-component liquid adhesive. "Two-component" refers to the adhesive being composed of a first component and a second component which are mixed, e.g. in a static or dynamic mixer, to form the adhesive. Similarly, "multi-component" refers to the adhesive being composed of a plurality of components, e.g. two, three, four or more components, which are mixed, e.g. in a static or dynamic mixer, to form the adhesive.

A liquid referred to herein in the context of the property sensor or of the determination process may have a dynamic viscosity of between 10 Pa·s (Pascalseconds) and 40,000.0 Pa·s, measured at a temperature of 25° C. The term "viscous liquid" used herein refers to a liquid having a dynamic viscosity of between 10 Pa·s and 40,000 Pa·s. Liquids of a higher dynamic viscosity may flow through the sensing zone of the property sensor only under excessive pressure which risks to damage the sensor. Dynamic viscosities can be determined according to ASTM D7042-12a using a Stabinger viscometer.

Hence in certain embodiments of the property sensor and of the determination process the liquid has a dynamic viscosity of between 10 Pascalseconds and 40,000.0 Pascalseconds, measured at 25° C. according to standard ASTM D7042-12a in its version in force on 1 Jul. 2020.

The present disclosure also provides a set of calibration data representing calibration impedance responses for use in the determination process described above, wherein the set of calibration data further represents a property value of a property of a calibration liquid at which property value one of the calibration impedance response was sensed.

A value of a specific property of the liquid can only be determined if a set of calibration impedance responses had been recorded for a plurality of values of that specific property of an identical liquid. Such a set of calibration impedance responses can be generated by miming a calibration liquid of a known value of a property in the determination process and in the property sensor and recording the response impedance for this value of the property of the calibration liquid, and by repeating this run for several values of the same property of the calibration liquid. The resulting set of calibration impedance responses is stored on the data storage device of the property sensor before running the actual liquid to be measured through the property sensor or the determination process. The "pre-" in "pre-stored" refers to this "before".

The calibration liquid is an identical liquid, identical to the liquid that is later run in the property sensor or the determination process to determine a value of the property.

The set of calibration data representing calibration impedance responses may be pre-stored in any format on the data storage device. It may, for example, be pre-stored in the format of n-tuples having n elements, wherein an element of the n-tuple is a property value, and another element of the n-tuple is a calibration impedance response determined at that property value.

A property value may be determinable only through measurements at different sensing frequencies. In certain scenarios, in which two properties of the liquid vary over time, e.g. mixing ratio in a two-component curable liquid and curing degree, a 1:4 mixing ratio of the uncured liquid may cause the same response impedance at a specific sensing frequency as a 1:3 mixing ratio of the liquid after five minutes of curing. If a single sensing frequency is used, this ambiguity may not be resolvable. However, when sensing response impedances at two different sensing frequencies, the response impedances may be different and can help distinguish between the mixing ratios.

Sensing a response impedance at different sensing frequencies may therefore help resolve ambiguities and derive the property value with a greater precision and reliability. To do this, the pre-stored set of calibration data representing calibration impedance responses needs to contain data sets recorded for different sensing frequencies, and each data set contains a value, e.g. as an element in an n-tuple, for the sensing frequency.

Hence in certain embodiments of the set of calibration data representing calibration impedance responses, the set of calibration data may further represent a sensing frequency at which sensing frequency one of the calibration impedance responses was sensed.

Temperature of the liquid in the sensing zone normally has a significant impact on the response impedances measured. A calibration impedance response data point advantageously contains a value of the temperature of the liquid in the sensing zone at which temperature the calibration impedance response was recorded. The pre-stored set of calibration data representing calibration impedance responses then needs to represent this temperature, facilitating the use of the calibration impedance responses for deriving from response impedances sensed at similar temperatures a property value of the property of the liquid.

Hence in certain embodiments of the set of calibration data representing calibration impedance responses, the set of calibration data further represents a temperature of the liquid in the sensing zone at which temperature one of the calibration impedance responses was sensed.

Certain sets of calibration data combine representation of sensing frequency and temperature. In certain embodiments of the set of calibration data representing calibration impedance responses, the set of calibration data further represents a sensing frequency at which sensing frequency one of the calibration impedance responses was sensed, and/or the set of calibration data further represents a temperature of the liquid in the sensing zone at which temperature one of the calibration impedance responses was sensed.

Property sensors and related processes described herein may find use in a variety of different applications like, for example, double checking an adhesive material in safety critical bonds in the rail, automotive or aerospace industry that gets on the critical parts and documenting the measurements. A second potential application is in response-based purging: automated systems for dispensing curable materials often work with cycle-times which include breaks for readjusting, joining, part exchange, etc. During those breaks material cures in the mixing nozzles and needs to be purged at a certain level of cure. The sensor can sense a current curing state and, when necessary, initiate curing, resulting in less waste and optimized cycle times. A further application may be in dispensing: At the start and at the end of the usage of static mixer systems often deviation occur in mixing ratio and mixing quality. The property sensor can reveal those and trigger adjustments in the dynamic parameters of the dispensing system, e.g. in flow rates, pre-pressure, timings. In this way also hose and reservoir ballooning effects might be mitigated. A further application may be in working samples/material twins where a sensor can be filled at a certain process step and then follow all process conditions like the material on the part undergoing curing oven, painting environment, etc. and regularly be checked to control the curing of adhesives or fillers during complex processes. The property sensor in a sensored mixer, and the processes according to the present disclosure can also be used for shelf-life indication: Materials that have condition-based shelf-life specifications can be tested with a comparison of sensor data with calibration data on material that was shelved under controlled conditions.

Aspects of the present disclosure will now be described in more detail with reference to the following Figures exemplifying particular embodiments.

Figure 1:
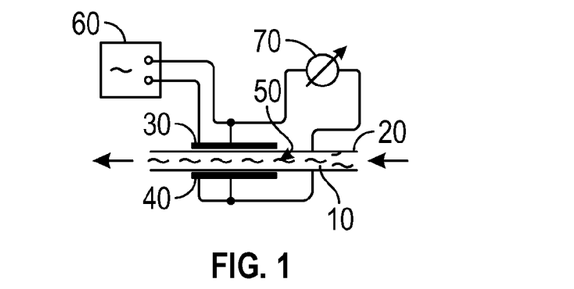
FIG. 1 Sectional view and circuit diagram of elements of a property sensor in a sensored mixer according to the present disclosure.

FIG. 1 illustrates, in a combined sectional view and circuit diagram, some key elements of a property sensor of a sensored mixer according to the current disclosure. A liquid 10 flows through a channel 20. A first electrode 30 and a second electrode 40 are arranged opposite to each other and can create an electric field between the electrodes 30, 40. The section of the channel 20 in the electric field between the electrodes 30, 40 is a sensing zone 50, in which a property value of a property of the liquid 10 can be determined.

For creating an electric field between the electrodes 30, 40 in the sensing zone 50, the electrodes 30, 40 are electrically connected to a voltage source 60 which applies an alternating (AC) voltage of one or more frequencies, the "sensing frequencies", to the electrodes 30, 40, so that the liquid 10 in the sensing zone 50 is exposed to an alternating electric field.

A current meter 70 is connected to the electrodes 30, 40 to measure current through the electrodes 30, 40 and thereby sense the impedance between the electrodes 30, 40. This impedance is sensed in response to the electric field applied between the electrodes 30, 40, and is influenced by the properties of the liquid 10 in the sensing zone 50, the impedance is therefore also referred to herein as "response impedance".

Useful sensing frequencies are frequencies that may range, for example, from 1 Hertz (Hz) to 10000 Hz. For an arrangement as shown in FIG. 1, a sensing frequency of 250 Hertz has been successfully used.

In the embodiment of FIG. 1 the electrodes 30, 40 are opposed flat parallel square plates of 13 mm side length, spaced at about 1 mm from each other, which form a plate capacitor. The resulting capacitance of the plate capacitor in air is approximately two picofarad (pF).

Figure 2:
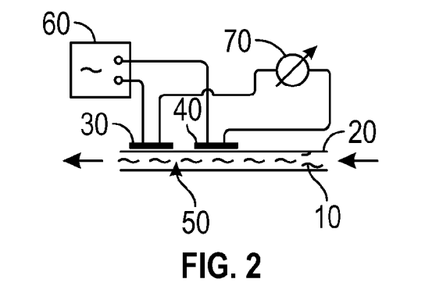
FIG. 2 Sectional view and circuit diagram of elements of an alternative property sensor in a sensored mixer according to the present disclosure.

While the plate capacitor arrangement of the electrodes 30, 40 in the embodiment of FIG. 1 creates a homogenous electrical field between the plates, other field geometries can be useful, for example the arrangement illustrated in FIG. 2, showing elements of an alternative property sensor in a sensored mixer according to the present disclosure. In this embodiment, the flat electrodes 30, 40 are located on the same side of the channel 20. Arranging the electrodes 30, 40 side by side on the same side of the channel 20 creates a highly inhomogeneous electric field. Certain field lines of that electric field, in the fringe field, extend through the sensing zone 50 so that the electric field can be used to sense properties of the liquid 10 in the sensing zone 50.

Figure 3:
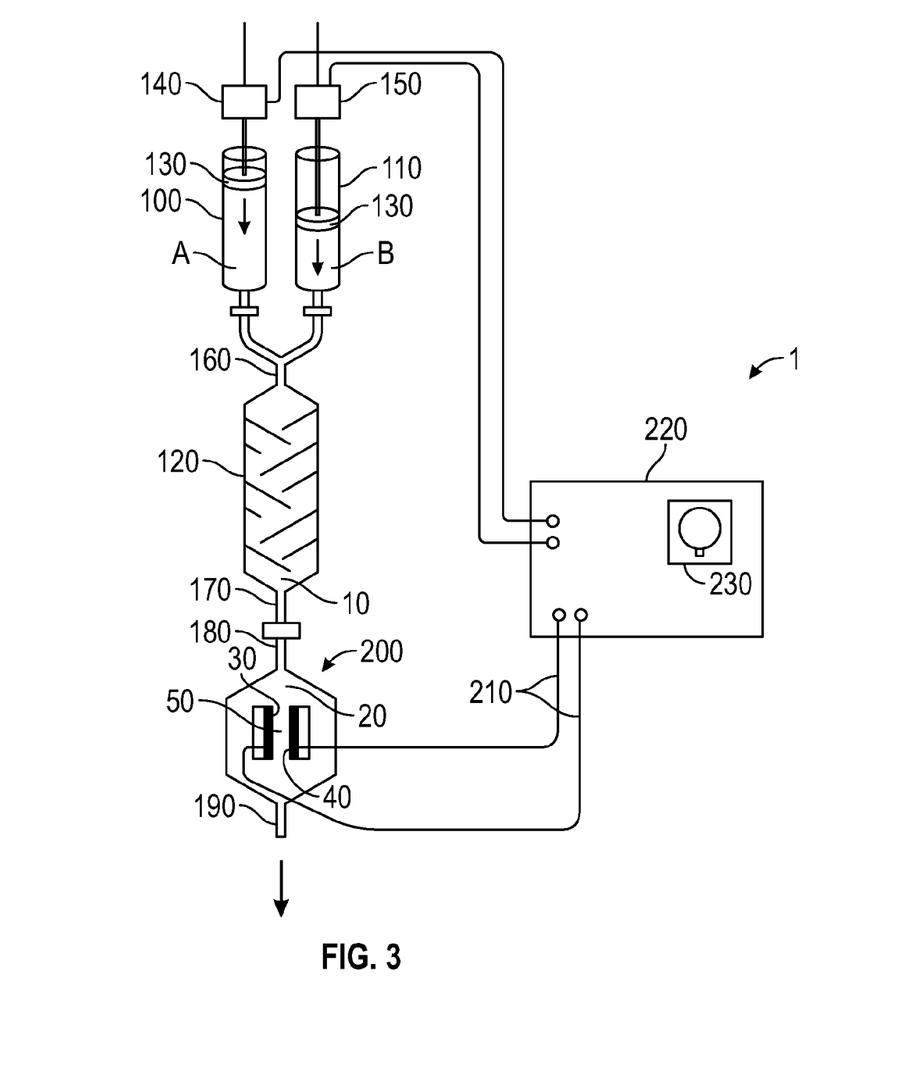
FIG. 3 Side view of a sensored mixer according to the present disclosure.

FIG. 3 is a side view of a sensored mixer according to the present disclosure mounted to a dispenser and mixer for a viscous two-component adhesive. First component A and second component B of the adhesive are pushed out of respective cartridges 100, 110 into and through a static mixer 120. At the output 170 of the static mixer, the mixed adhesive passes through the property sensor 1 before being dispensed at the output of the duct piece of the property sensor 1. The property sensor 1 senses the mixing ratio of components A and B in the mixed adhesive.

The cartridges 100, 110 contain the viscous components A and B, respectively. A respective piston 130 is moved further into the cartridge 100, 110 and pushes the component A, B out. The pistons 130 are driven by respective motors 140, 150 which are individually controllable, and the pressure generated by the pistons 130 moves the unmixed components and—after mixing—the mixed viscous adhesive 10 through the static mixer 120 and the channel 20 of the property sensor 1. The motors 140, 150 are connected to the property sensor 1 in order to establish a feedback loop: When the property sensor 1 senses a mixing ratio outside an acceptable band of desired mixing ratios, the motors 140, 150 can be individually controlled such as to push more of component A and/or less of component B (or vice versa) into the static mixer 120 in order to adjust the mixing ratio towards the desired mixing ratio. Both motors 140, 150 can be controlled separately to obtain a desired total throughput per second of mixed adhesive to be dispensed.

The static mixer 120 receives the unmixed components A and B of the two-component adhesive at an input end 160. Lamellae inside the static mixer 120 redirect the flow of the input materials many times and introduce shear forces that help mix the components A and B with each other. The output end 170 of the static mixer 120 is connected to an inlet 180 of a duct piece 200 (shown in longitudinal sectional view) containing the channel 20, the sensing zone 50 and the electrodes 30, 40, as described in the context of FIGS. 1 and 2, of the property sensor 1. The mixed adhesive 10 can thus exit the static mixer 120 and enter the duct piece 200. The duct piece 200 will be explained in more detail in FIG. 4. At the outlet 190 of the duct piece 200, the mixed adhesive 10 is dispensed.

The electrodes 30, 40 are flat, parallel plates facing each other. They are connected via wires 210 to a computerized control system 220, which provides an AC voltage of 6 Volt to the electrodes 30, 40 to generate the electric field at a sensing frequency of 250 Hertz in the sensing zone 50. The control system also measures current through the electrodes 30, 40 and senses a response impedance between the electrodes 30, 40, taking into account the current, the voltage and the sensing frequency.

The computerized control system 220 has an internal data storage device 230, namely a harddisk 230, on which a set of calibration data representing calibration impedance responses is stored. These calibration impedance responses were recorded previously, i.e. before the measurements, in a calibration process using the same duct piece 200 and identical components A, B resulting in an identical mixed viscous adhesive 10. During the calibration process the mixing ratio A/B was adjusted to certain fixed calibration mixing ratios (CMR), and for each of these calibration mixing ratios the calibration impedance response (CIR) was sensed at five different calibration sensing frequencies (CSF). These data sets, e.g. in the form of triples of (CMR, CSF, CIR), are recorded on the harddisk 230. They form a three-dimensional data field, which is specific for the viscous adhesive. The data sets are used to build a parametrized multi-dimensional model, based on multi-dimensional polynomials, of the data sets. This parametrized model facilitates quick interpolation by a computer between individual data sets and quick derivation of a property value of a property of the liquid in the subsequent measurement. The parameters of the parametrized model form a set of calibration data which represents the data sets recorded during the calibration process.

Later, when running an actual measurement of the value of the property "mixing ratio" of a viscous two-component adhesive of components A and B in the property sensor 1, the measured impedance responses (MIR), each measured at certain measurement sensing frequencies (MSF), are recorded in the control system 220. In order to derive a value for the mixing ratio from the measured impedance responses at the measurement sensing frequencies, software running on the control system 220 identifies, within the set of calibration impedance response triples, those triples having the closest calibration response impedances, closest to the measured impedance responses, and the closest calibration sensing frequencies, closest to the measurement sensing frequencies. This identification and a potential interpolation can be performed easily by using the parametrized multi-dimensional polynomials modelling the plurality of data sets, i.e. the plurality of triples of (CMR, CSF, CIR). From those calibration data, the software derives a value for the (sofar unknown) mixing ratio in the actual measurement.

The same sensing frequencies used for calibration will often be used also for the measurement. There may, however, occur a mixing ratio in the measurement for which no calibration impedance response had been determined in calibration. So there may be not an exact match in both sensing frequency and response impedance between a triple in the calibration data set. In such a case, an interpolation between two suitably chosen calibration triples, containing two calibration impedance responses close to the measured response impedance, yields an interpolated calibration mixing ratio which can then be considered the mixing ratio in the measurement. The interpolation is performed by software on the control system 220, using the parametrized multi-dimensional polynomials.

The result of the interpolation and derivation is a value of the mixing ratio of components A and B in the mixed two-component adhesive 10 in the sensing zone 50 during the measurement.

In the present embodiment, the calibration impedance responses were measured in their dependence on two parameters, namely on the sensing frequency and on the mixing ratio. In other embodiments, dependence of impedance responses on further parameters may be taken into account, such as, for example, dependence on the temperature of the adhesive in the sensing zone. A data set of the calibration impedance responses would then be a quadruple of values, such as (CMR, CSF, CIR, Temperature), and the pre-stored set of calibration impedance responses would be a set of quadruples forming a four-dimensional data field, which is specific for the viscous adhesive. Taking further parameters into account could make a data set be a quintuple of values, or high-order tuples of values, so that the data sets of calibration impedance responses is a multi-dimensional data field of more dimensions and can be represented by different parametrized multi-dimensional polynomials.

The control system 220 records the values for mixing ratio, with a time stamp, for quality assurance. In the particular embodiment shown in FIG. 3, the motors 140, 150 pushing the respective components A and B into the static mixer 120 are connected to, and controlled by, the control system 220. The mixing ratio derived during the actual measurement is checked continuously against a desired mixing ratio. If its deviation from the desired mixing ratio is larger than acceptable, the control system 220 changes the speed of one or both of the motors 140, 150 suitably to adjust the measured mixing ratio towards the desired mixing ratio.

Figure 4:
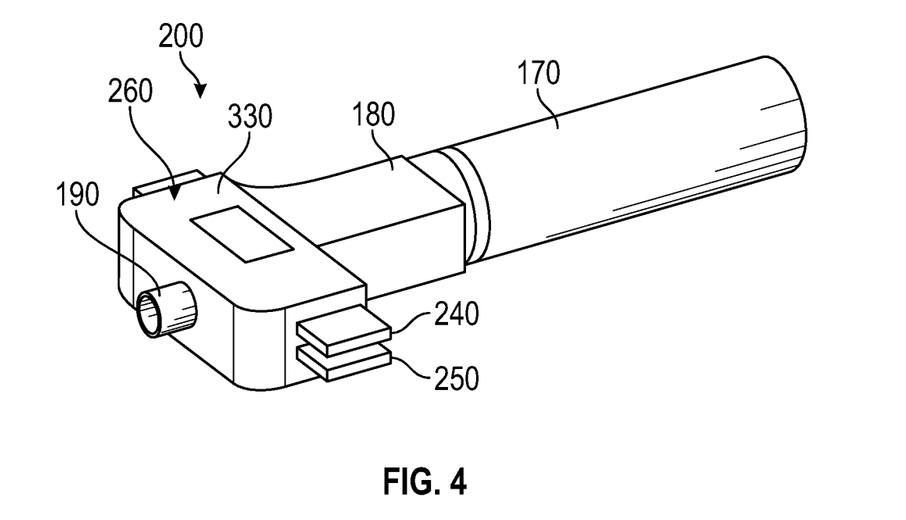
FIG. 4 Perspective view of a duct piece containing channel and electrodes of a property sensor in a sensored mixer according to the present disclosure.

FIG. 4 is a perspective view of the duct piece 200 of the property sensor 1 of FIG. 3. A housing 330 of the duct piece 200 forms an inlet 180 and an outlet 190, the inlet 180 being connected to the output end 170 of the static mixer 120. The viscous adhesive 10 is dispensed through the outlet 190. The duct piece 200 thereby forms a channel 20 for the viscous adhesive 10 flowing from inlet 180 to outlet 190. In operation, the duct piece 200 is completely filled with the mixed viscous adhesive 10.

As the shape of the housing 330 indicates, the duct piece 200 comprises a widened middle portion 260. The channel 20 is wider in the middle portion 260 of the duct piece 200 than it is at the inlet 180, so that the adhesive 10 has, in the middle portion 260, a larger open cross section available to flow through. The size of the widened open cross section in the middle portion 260 is larger than the size of the open cross section of the inlet 180. This reduces the pressure and the flow speed of the adhesive 10 in the middle portion 260 of the duct piece 200, which in turn facilitates precise sensing of response impedance in the duct piece 200.

In this embodiment the electrodes 30, 40 are formed by conductive layers on two respective printed circuit boards (PCBs) 240, 250, which extend laterally through the duct piece 200 and stick out on the sides of the duct piece 200. The first electrode 30 is a conductive layer on the lower surface of the first, upper PCB 240. It faces the second electrode 40, which is a further conductive layer on the upper surface of the second, lower PCB 250. The electrodes 30, 40 are thus parallel conductive plates, separated by a gap through which a portion of the adhesive 10 flows from inlet 180 to outlet 190.

It is generally advantageous to keep the extension of the electrodes 30, 40 short in direction of the flow path 270, as this reduces the flow resistance and the pressure of the liquid 10 on the electrodes 30, 40.

Figure 5:
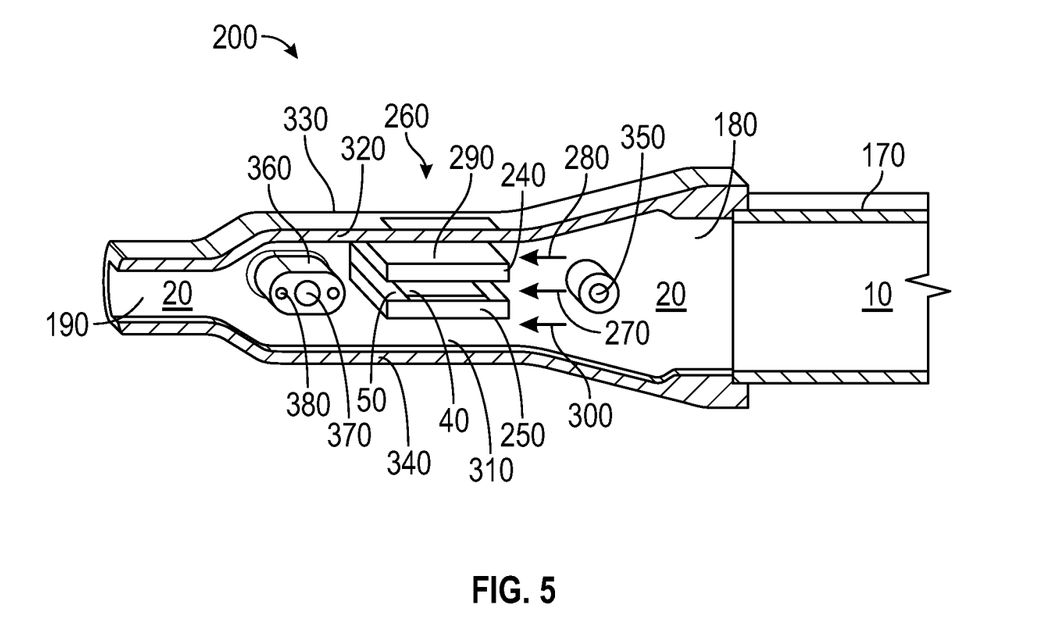
FIG. 5 Perspective cut-away view of the duct piece of FIG. 4.

FIG. 5 is a perspective cut-away side view of the duct piece 200 of FIG. 4. Through the output end 170 of the static mixer, liquid adhesive 10 is conveyed through the duct piece 200 via the channel 20 and is dispensed through the outlet 190.

The upper PCB 240 and the lower PCB 250 are arranged parallel to each other and parallel to the flow direction of the liquid adhesive 10 in the channel 20 between inlet 180 to outlet 190. Each PCB 240, 250 has, on the surface facing the other PCB 240, 250, a flat conductive patch forming an electrode 30, 40, of the property sensor 1. In FIG. 5, only the electrode 40 on the upper surface of the lower PCB 250 is visible, the opposed electrode 30 on the lower surface of the upper PCB 240 is not visible. An electric field is generated between the electrodes 30, 40, as explained above. The electrodes 30, 40 are embedded in the flow of liquid adhesive 10 and in contact with the liquid adhesive 10. The electrodes 30, 40 can be electrically connected via conductive traces (not shown) on the surface of the respective PCB 240, 250, extending through the walls of housing 330 to outside the housing 330.

The sensing zone 50 is the portion of the channel 20 between the electrodes 30, 40. A first portion 270 of the liquid adhesive 10 flows through the sensing zone 50 between the electrodes 30, and is used to sense a response impedance between the electrodes 30, 40. In the embodiment illustrated in FIG. 5, the duct piece 200 defines three different parallel flow paths for flow of the liquid adhesive 10 from inlet 180 to outlet 190. The first flow path 270 is through the sensing zone 50 between the electrodes 30, 40. A second flow path for a second portion 280 of the adhesive 10 is through an upper bypass 290 between the upper surface of the upper PCB 240 and the upper wall 320 of the housing 330 of the duct piece 200, a third flow path for a third portion 300 of the adhesive 10 is through a lower bypass 310 between the lower surface of the lower PCB 250 and the lower wall 340 of the housing 330. All three flow paths, including the bypasses 290, 310, are part of the channel 20 through which the adhesive 10 flows from inlet 180 to outlet 190.

Each of the bypasses 290, 310 has an open cross section for the flow of the liquid adhesive that is roughly equal to the open cross section of the flow path through the sensing zone 50 between the electrodes 30, 40. The pressure difference between upper and lower surface of a PCB 240, 250 is therefore small, which helps reduce or even avoid deformation of the PCBs 240, 250 and a related error in the response impedance sensing.

The duct piece 200 comprises a temperature sensor 350, arranged in the middle of the channel 20 before the channel 20 divides into different flow paths 50, 290, 310. The temperature sensor 350 senses the temperature of the adhesive 10 before a portion 270 of it enters the sensing zone 50. Some response impedances and calibration impedance responses measured to derive a value of certain properties of the adhesive 10 vary strongly with temperature of the adhesive 10, so it is important to measure the temperature with high accuracy, e.g. an accuracy of +/−0.1° C. In certain property sensors 1, however, in which it may be guaranteed that adhesives 10 entering the duct piece 200 have a well-defined temperature, the temperature sensor may not be needed.

The duct piece 200 also comprises a flow sensor 360 for determining a flow rate of the adhesive 10 through the channel 20. Where the adhesive 10 changes its property within the short time during which it travels through the mixer 120 and into the channel 20, the flow sensor 360 may allow to determine approximately the flow time through the mixer 120 and into the duct piece 200, and thereby to estimate an approximate value of the property. Also, the flow sensor 360 can help detect an interruption in dispensing and related curing of the adhesive 10 in the duct piece 200, which could render certain measurement results meaningless. The flow sensor 360 is arranged downstream from the sensing zone 50 and comprises a heating resistor 370 and a second temperature sensor 380, arranged close to the heating resistor 370. A suitable electric current applied to the heating resistor 370 heats the surrounding adhesive 10, and a flow rate can be derived from the temperature difference between the first temperature sensor 350 upstream of the sensing zone 50 and the second temperature sensor 380.

The invention claimed is:

1. A sensored mixer comprising a mixing device (120) for mixing two or more components (A, B) to produce a mixed liquid (10) at a mixer output (170), and a property sensor (1) for determining a property value of a property of the mixed liquid (10), the property sensor comprising a) a channel (20) comprising a sensing zone (50) through which-in use-the mixed liquid flows; b) two electrodes (30, 40) for generating an electric field of one or more sensing frequencies in the sensing zone; c) a data storage device (230) comprising a pre-stored set of calibration data representing calibration impedance responses measured previously at the one or more sensing frequencies and at different property values of the property of an identical liquid; and d) a property value deriver (220), electrically connected to the electrodes (30, 40), and operable to repeatedly i) generate, while the mixed liquid (10) flows through the sensing zone (50), between the electrodes (30, 40) an electric field of the one or more sensing frequencies in the sensing zone; ii) sense between the electrodes (30, 40), at the one or more sensing frequencies, while the mixed liquid (10) flows through the sensing zone (50) and while the electric field is present, a response impedance; iii) derive from the response impedance a property value of the property of the mixed liquid (10), using the pre-stored set of calibration data representing calibration impedance responses, wherein the property sensor (1) is in fluid communication with the mixer output (170) such that the mixed liquid (10) can flow from the mixer output (170) through the sensing zone (50).

2. The sensored mixer according to claim 1, wherein the channel (20) comprises a first longitudinal section (180) having a first open cross section available for the flow of the mixed liquid (10), and a second longitudinal section (260), downstream from the first longitudinal section (180), having a second open cross section available for the flow of the mixed liquid (10), wherein the second open cross section is larger than the first open cross section, and wherein the sensing zone (50) is comprised in the second longitudinal section (260).

3. The sensored mixer according to claim 1, wherein one or both of the electrodes (30, 40) is/are arranged such as to be in contact with the mixed liquid (10) when the liquid flows through the sensing zone (50).

4. The sensored mixer according to claim 1, wherein the sensing zone (50) is arranged between the electrodes (30, 40).

5. The sensored mixer according to claim 1, wherein the channel (20) comprises a bypass (290, 310), arranged such that a first portion (270) of the mixed liquid (10) flows through the sensing zone (50), and a second portion (280, 300) of the liquid flows through the bypass (290, 310) bypassing the sensing zone.

6. The sensored mixer according to claim 5, wherein one of the electrodes (30, 40) is arranged between the sensing zone (50) and the bypass (290, 310).

7. The sensored mixer according to claim 1, further comprising a temperature sensor (350) for sensing a temperature of the mixed liquid (10) in the channel (20) or in the sensing zone (50).

8. The sensored mixer according to claim 1, further comprising a flow speed sensor (360) for sensing a flow speed of the mixed liquid (10) through the channel (20) or through the sensing zone (50).

9. A process of determining a property value of a property of a liquid (10), comprising the steps, in this sequence, of i) providing a liquid (10) and a property sensor (1) for determining a property value of a property of the liquid (10), the property sensor comprising a) a channel (20) comprising a sensing zone (50) through which-in use-the liquid flows; b) two electrodes (30, 40) for generating an electric field of one or more sensing frequencies in the sensing zone; c) a data storage device (230) comprising a pre-stored set of calibration data representing calibration impedance responses measured previously at the one or more sensing frequencies and at different property values of the property of an identical liquid; and d) a property value deriver (220), electrically connected to the electrodes (30, 40), and operable to repeatedly 1) generate, while the liquid (10) flows through the sensing zone (50), between the electrodes (30, 40) an electric field of the one or more sensing frequencies in the sensing zone; 2) sense between the electrodes (30, 40), at the one or more sensing frequencies, while the liquid (10) flows through the sensing zone (50) and while the electric field is present, a response impedance; 3) derive from the response impedance a property value of the property of the liquid (10), using the pre-stored set of calibration data representing calibration impedance responses, and having the liquid (10) flow through the sensing zone (50); ii) generating, while the liquid (10) flows through the sensing zone (50), between the electrodes (30, 40) an electric field of the one or more sensing frequencies in the sensing zone (50); iii) sensing between the electrodes (30, 40), at the one or more sensing frequencies, while the liquid (10) flows through the sensing zone (50) and while the electric field is present, a response impedance; iv) deriving from the response impedance a property value of the property of the liquid (10), using the pre-stored set of calibration data representing calibration impedance responses.

10. The process according to claim 9, wherein at least one of the one or more sensing frequencies is a frequency of between 1 Hertz and 10000 Hertz, and wherein the amplitude of the electric field is between 100 Volt per meter and 20000 Volt per meter.

11. The process according to claim 9, wherein the liquid (10) is an adhesive or a curable adhesive or a two-component adhesive or a multi-component adhesive or a curable two-component adhesive.

12. The process according to claim 9, wherein the liquid (10) has a dynamic viscosity of between 10 Pascalseconds and 40,000.0 Pascalseconds, measured at 25° C. according to standard ASTM D7042-12a in its version in force on 1 Jul. 2020.

13. A method comprising forming a set of calibration data representing calibration impedance responses for use in the process according to claim 9, wherein the set of calibration data further represents a property value of a property of a calibration liquid at which property value one of the calibration impedance response was sensed.

14. The method according to claim 13, wherein the set of calibration data further represents a sensing frequency at which sensing frequency one of the calibration impedance responses was sensed, and/or wherein the set of calibration data further represents a temperature of the liquid (10) in the sensing zone (50) at which temperature one of the calibration impedance responses was sensed.

* * * * *